(12) United States Patent
Golovin

(10) Patent No.: US 6,428,931 B1
(45) Date of Patent: Aug. 6, 2002

(54) METHODS FOR MAKING OXYGEN REDUCTION CATALYST USING MICELLE ENCAPSULATION AND METAL-AIR ELECTRODE INCLUDING SAID CATALYST

(75) Inventor: Neal Golovin, Pepper Pike, OH (US)

(73) Assignee: AER Energy Resources, Inc., Smyrna, GA (US)

( * ) Notice: Subject to any disclaimer, the term of this patent is extended or adjusted under 35 U.S.C. 154(b) by 89 days.

(21) Appl. No.: 09/639,476

(22) Filed: Aug. 15, 2000

(51) Int. Cl.$^7$ ............................................... H01M 10/24
(52) U.S. Cl. ........................ 429/224; 429/40; 423/599
(58) Field of Search ........................... 429/40, 41, 44, 429/45, 224, 231.7; 423/599

(56) References Cited

U.S. PATENT DOCUMENTS

| | | | |
|---|---|---|---|
| 2,681,268 A | | 6/1954 | Nossen |
| 3,915,837 A | | 10/1975 | Feige, Jr. |
| 3,948,684 A | * | 4/1976 | Armstrong .................. 429/224 |
| 4,121,018 A | * | 10/1978 | Kocherginsky et al. ....... 429/27 |
| 4,269,691 A | * | 5/1981 | Deborski .................... 429/224 |
| 4,302,301 A | | 11/1981 | Tierman |
| 4,476,104 A | | 10/1984 | Mellors |
| 4,590,059 A | | 5/1986 | Mellors |
| 4,595,643 A | * | 6/1986 | Koshiba et al. ............... 429/27 |
| 4,894,296 A | | 1/1990 | Borbely et al. |
| 5,069,988 A | | 12/1991 | Tomantschger et al. |
| 5,281,490 A | | 1/1994 | Nishioka et al. |
| 5,378,562 A | * | 1/1995 | Passaniti et al. ............. 429/224 |

OTHER PUBLICATIONS

Youichi Shimizu, Haruyuki Matsuda, Norio Miura, and Noboru Yamazoe, "Bi-functional Oxygen Electrode Using Large Surface Area Perovskite–type Oxide Catalyst for Rechargeable Metal–Air Batteries"; Chemistry Letters; 1992; pp. 1033–1036; The Chemical Society of Japan; Kyushu Universtiy, Japan.

Youichi Shimizu, Akiyoshi Nemoto, Takeo Hyodo, Norio Miura and Noboru Yamazoe; "Gas Diffusion–Type Oxygen Electrode Perovskite–type Oxides for Rechargeable Metal–Air Batteries"; Aug. 24, 1993; pp. 1458–1460; vol. 61, No. 12; Denki Kagaku; Japan.

Takeo Hyodo, Norio Miura, and Noboru Yamazoe; "Gas Diffusion–Type Oxygen Electrode Using Perovskite–Type Oxides for Metal–Air Batteries"; Mat. Res. Soc. Symp. Proc.; 1995; pp. 79–84; vol. 393; Materials Research Society; Japan.

T. Hyodo, M. Hayashi, N. Miura, and N. Yamazoe; "Catalytic Activities of Rare–Earth Manganites for Cathodic Reduction of Oxygen in Alkaline Solution"; J. Electrochem Soc.; Nov. 1996; pp. L266–L267; vol. 143, No. 11; The Electrochemical Society, Inc.; Japan.

L. M. Gan, L. H. Zhang, H.S. O. Chan, C.H. Chew, B. H. Loo; "A novel method for the synthesis of perovskite–type mixed metal oxides by the inverse microemulsion technique"; Journal of Materials Science; 1996; pp. 1071–1079; vol. 31; Chapman & Hall; USA.

Toshiyuki Masui, Kazuyasu Fujiwara, Yumin Peng, Ken–Ichi Machida, and Gin–Ya Adachi; "Carbon Monoxide Oxidation Characteristics over the $Al_2O_3$–supported $CeO_2$–$ZrO_2$ Catalysts Prepared by the Microemulsion Method"; Chemistry Letters; 1997; pp. 1285–1286; The Chemical Society of Japan; Japan.

Masahiko Hayashi, Hiromi Uemura, Kengo Shimanoe, Norio Miura, and Noboru Yamazoe; "Enhanced Electrocatalytic Activity for Oxygen Reduction Over Carbon–Supported $LaMnO_3$ Prepared by Reverse Micelle Method"; Electrochemical and Solid–State Letters; 1998; pp. 268–270; vol. 1, No. 6; The Electrochemical Society, Inc.; Japan.

* cited by examiner

Primary Examiner—Patrick Ryan
Assistant Examiner—M. Wills
(74) Attorney, Agent, or Firm—Alston & Bird LLP

(57) ABSTRACT

A manganese based catalyst for use in a metal-air electrochemical cell wherein the catalyst is made by a micelle process and a method of producing the catalyst. An electrode comprising said catalyst and method of producing the electrode. The micelle encapsulation process creates catalyst particles that are submicron and easily distributed throughout the active layer of the electrode.

39 Claims, 1 Drawing Sheet

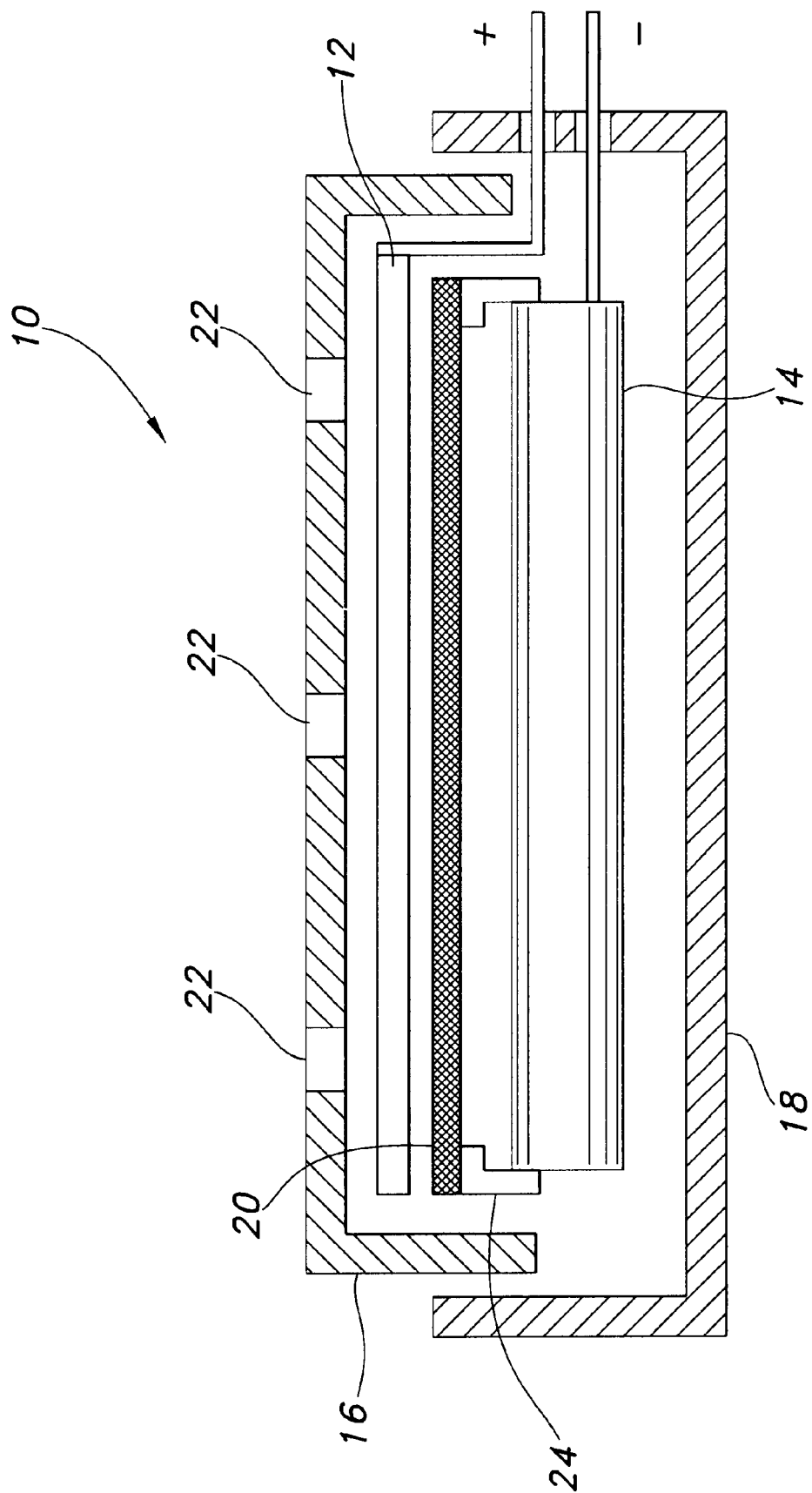

METHODS FOR MAKING OXYGEN REDUCTION CATALYST USING MICELLE ENCAPSULATION AND METAL-AIR ELECTRODE INCLUDING SAID CATALYST

FIELD OF INVENTION

The present invention relates to a manganese based catalyst for use in a metal air electrochemical cell, and more particularly, relates to the composition and manufacture of an air electrode comprising said catalyst.

BACKGROUND OF THE INVENTION

Metal-air electrochemical cells utilize oxygen from the ambient air as a reactant in an electrochemical reaction to provide a relatively lightweight power supply. Generally described, a metal-air cell includes an air-permeable cathode and a metallic anode separated by an aqueous electrolyte. During the operation of a metal-air cell, oxygen from the ambient air is reduced at the cathode to form hydroxide ions. The metal is oxidized at the anode and reacts with the hydroxide ions, such that electrons are released to provide electrical energy.

Most air electrodes are either inherently or by purposive implementation, catalytically active. Although effective air electrodes are available, there remains a need for air electrodes with enhanced catalytic activity. An important factor in optimizing electrode performance is catalyst particle dispersion. The more uniformly the catalyst is dispersed and the smaller the size of the catalyst particles, the higher the activity of the air electrode. With conventional methods of catalyst production it is difficult to reduce the particle size of the catalyst enough to uniformly distribute it throughout the active layer of the electrode.

SUMMARY OF INVENTION

The present invention fulfills the above-described need by providing a method of producing a manganese based oxygen reduction catalyst for use in an air electrode using micelle encapsulation. This invention also encompasses the resulting catalyst, a cathode comprising said catalyst and methods of making a cathode comprising said catalyst. As a result of the micelle method, the catalyst has particles which are submicron and easily dispersed throughout a catalyst support.

More particularly, the present invention relates to a method of producing a manganese based oxygen reduction catalyst wherein a first solution comprising a first surfactant and manganese nitrate and a second solution comprising a second surfactant and ammonium hydroxide are prepared. The two solutions and activated carbon are admixed and then sonicated to form micelles comprising manganese and carbon. A precipitate is obtained by centrifugation and heated at a temperature between 450° C. to 700° C. to form a manganese oxide. The micelle size is submicron and the resulting size of manganese adsorbed onto the carbon surface is also submicron.

The present invention also relates to an air cathode comprising the above-described catalyst. More particularly, the air cathode comprises an active layer including the oxygen reduction catalyst of the present invention. In addition, the air cathode includes a current collector in electrical contact with the electrode. The active layer of the air cathode further comprises carbon black and a non-wetting agent/binder such as polytetrafluoroethylene.

The air cathode of the present invention is made according to a process comprising forming an active layer made with the oxygen reduction catalyst of the present invention, and positioning a current collector in electrical contact with the air cathode. More particularly, the active layer is formed by admixing the manganese based catalyst with an adsorptive particulate material, such as carbon black, and a non-wetting agent/binder, such as polytetrafluoroethylene.

Other objects, features, and advantages of this invention will become apparent to those skilled in the art upon understanding the foregoing detailed description and accompanying drawings.

BRIEF DESCRIPTION OF THE DRAWINGS

FIG. 1 is a partial, cross-sectional, elevation view of a metal-air cell made in accordance with an embodiment of the present invention.

DETAILED DESCRIPTION OF THE PREFERRED EMBODIMENT

As summarized above, this invention encompasses a method of producing a manganese based catalyst for use in a metal-air electrochemical cell, an air cathode comprising said catalyst, and a method for making the air cathode. Embodiments of this invention are described in detail below.

The catalyst of the present invention is produced by a micelle encapsulation method wherein a first solution comprising a first surfactant, a first solvent, and a soluble manganese (II) salt is prepared. A second solution comprising a second surfactant, a second solvent, and ammonium hydroxide is prepared. An ultrasonic bath may be used to mix each of the solutions. The ammonium hydroxide is preferably tetraethylammonium hydroxide $(C_2H_5)_4NOH$. Suitable surfactants for the first and second surfactants include any surfactant capable of bringing an aqueous system into an organic phase. The first and second surfactant is preferably a nonionic surfactant such as Igepal 520. Cyclohexane is the preferred solvent for the first and second solvents. Other suitable solvents include, but are not limited to hexane, petroleum ether, and decalin. The first surfactant can be the same or different from the second surfactant, and the first solvent can be the same or different from the second solvent.

The first solution desirably comprises from about 45% to about 80% by weight solvent, from about 10% to about 30% by weight surfactant, and from about 10% to about 25% by weight manganese (II) salt. The second solution desirably comprises from about 45% to about 80% by weight solvent, from about 10% to about 30% by weight surfactant, and from about 10% to about 25% by weight ammonium hydroxide.

The first solution preferably comprises about 60% by weight solvent, about 25% by weight surfactant, and about 15% by weight manganese (II) salt. The second solution preferably comprises about 60% by weight solvent, about 25% by weight surfactant, and 15% by weight ammonium hydroxide.

Any soluble manganese (II) salt may be used in the first solution. Examples of suitable manganese salts include but are not limited to manganese nitrate and manganese (II) acetate. Preferably, the manganese salt is manganese nitrate.

Micelles are formed in the first and second solutions upon the mixing of the surfactant and the solvent in each solution. The surfactant molecules have a hydrophillic end and hydrophobic end. The hydrophillic end is oriented away from the solvent, forming the center of the micelle, and the hydrophobic end is oriented toward the solvent. The diameter of the micelle is controlled by adjusting the water to surfactant ratio.

After the first and second solutions are prepared, they are combined, sonicated and mixed with activated carbon. Alternatively, the activated carbon may be added to the first solution before mixing with the second solution, followed by sonification. A suitable active carbon is Calgon Carbon PWA grade activated carbon (available from Calgon Carbon Corporation of Pittsburgh, Pa.). Energy is added to the solutions via sonification in order to reform the micelles so that manganese and carbon are located in the center of the micelles.

The resulting solution is then subjected to centrifugation wherein a precipitate is isolated. The precipitate is then heated at a temperature from about 450° C. to about 700° C. under an inert atmosphere to yield a manganese oxide. The resulting particle size of the manganese adsorbed onto the carbon surface is submicron. As a result, the catalyst particles are small enough to be uniformly distributed within an electrode.

As shown in FIG. 1, a metal-air cell 10 made according to this invention is desirably arranged so that the air cathode 12 is positioned adjacent a gelled anode 14 in a cell case comprising an upper case 16 and a lower case 18. A separator material 20 is located between the air cathode 12 and the gelled anode 14. A frame 24 located within the cell case is positioned to partially surround the separator 20 and the air cathode 12. The air cathode 12 is disposed adjacent an opening 22 in the upper cell case 16 so that the air cathode can be exposed to air. Preferably, the metal air cell 10 is prismatic in shape.

The air cathode 12 of the present invention comprises an active layer formed on a current collector. The active layer has an air side which faces outwardly from the upper cell case 16 and an electrolyte side which faces toward the gelled anode 14. Generally described, the active layer comprises the oxygen reduction catalyst of the present invention, an oxygen adsorptive particulate material, such as carbon black, and a binder/non-wetting agent. Preferably, the oxygen reduction catalyst is distributed throughout the active layer of the air cathode 12.

The active layer of the air cathode 12 may comprise one or more oxygen reduction catalysts in addition to the catalyst of the present invention. Additional oxygen reduction catalysts include, but are not limited to manganese, silver, or spinels having the formula $M_xO_y$ (M=Co or Ni), transition metal macrocyclics such as cobalt tetramethoxyphenylporphyrin (CoTMPP), and pervoskites such as lanthanum/nickel/cobalt oxide ($LaNi_{1-x}CO_xO_y$) or lanthanum/iron/cobalt oxide ($LaFe_{1-x}CO_xO_y$), and mixtures thereof. Manganese is preferred.

The oxygen reduction catalysts are present in an amount effective to produce a satisfactory level of current on the first and subsequent discharge cycles of the metal-air cell 10 in which the air cathode 12 is used.

The oxygen adsorptive particles in the active layer of the air cathode 12 are preferably carbon black. Desirably, the carbon black is a mixture of carbon black comprising relatively high surface area carbon black and lower surface area carbon black. A suitable high surface area carbon black has a surface area from about 200 to about 2000 $m^2/g$ and a suitable low surface area carbon black has a surface area from about 50 to about 200 $m^2/g$. Suitable binder/non-wetting agents include polytetrafluoroethylene (Teflon).

The relative amounts of the components of the air cathode active layer may vary. Preferably, however, the oxygen reduction catalyst is present in the active layer in a total amount from about 3 to about 10 percent by weight of the active layer, the carbon black is present in an amount from about 70 to about 85 percent by weight of the active layer, and the polytetrafluoroethylene is present in the active layer in a total amount from about 5 to about 25 percent by weight of the active layer. According to one embodiment, the oxygen reduction catalyst is present in an amount of 5% by weight of the active layer, the carbon black is present in an amount of 75% by weight of the active layer, and the non-wetting agent/binder is present in an amount of 20% by weight of the active layer.

The air cathode 12 also includes a current collector in electrical contact with the cathode. The current collector is preferably a nickel plated screen or nickel expanded metal and preferably is a double cold bonded nickel screen. Suitable current collectors are effective conductors of electric current but are inert to the electrolyte and other components of the metal-air cell 10 in which the air cathode 12 is used. Generally, suitable current collectors include fine mesh metal screens and expanded, perforated metal sheets made of non-corrosive metal such as nickel, tin, or titanium.

The anode 14 also includes a current collector made of a metal which is capable of conducting electricity produced during discharge of a cell but not being oxidized during discharge of the cell. Typical metals for the current collector include brass, copper, nickel, tin, titanium, or a metallic substrate coated with these materials. The anode current collector is desirably a wire mesh or an expanded metal screen. The anode 14 also includes a brass screen current collector.

The separator 20 disposed between the air cathode 12 and the gelled anode 14 separates the cathode and anode so that the electrodes do not come in direct electrical contact with one another and short circuit the cell 10. The separator 20 is adhered to the electrolyte side of the cathode 12. More particularly, the separator 20 is oxidation-resistant under conditions of operation of the metal-air cell and is permeable to electrolyte, but substantially impermeable to the metallic ions and compounds produced at the anode 14. A suitable material for the separator 20 is 3501 CELGARD™ wettable microporous polypropylene from Hoechst Celanese Corporation of Charlotte, N.C.

The air side of the cathode 12 is covered with a water impermeable film such as a polytetrafluoroethylene film. This film is adhered to the air side of the air cathode 12 and inhibits the transfer of electrolyte in and out of the cell through the air cathode 12.

The air cathode 12 of the present invention is made according to a process comprising forming an active layer made with the oxygen reduction catalyst of the present invention, and positioning the current collector in electrical contact with the active layer. The active layer is formed by admixing the oxygen reduction catalyst with an adsorptive particulate material, such as carbon black, and a non-wetting agent/binder, such as polytetrafluoroethylene.

The air cathode 12 can be made by conventional methods known to those skilled in the art such as filtration using methanol or water or both as a solvent and the wet paste method using methanol or water as a solvent. U.S. Pat. No. 4,129,489 to Chottiner, titled "Multi-Ply Laminar Pasted Air Electrodes", the entire disclosure of which is incorporated herein by reference, discloses a suitable wet paste method. Desirably, however, the air cathode 12 is made by a dry press method described hereinbelow.

Another suitable cathode 12 includes a hydrophobic layer, an active layer, and a current collector. The hydrophobic layer comprises a low surface area, conductive carbon black, such as Shawinigan acetylene black, and a particulate PTFE binder. The active layer comprises an activated carbon treated with the oxygen reduction catalyst of the present invention so as to produce a mixture of $Mn^{+3}$ and $Mn^{+4}$ on the carbon surface, a high surface area conductive carbon black, and PTFE (polytetrafluoroethylene) binder. A suitable activated carbon is Calgon Carbon PWA grade activated carbon (available from Calgon Carbon Corporation of Pittsburgh, Pa.) having an iodine surface area of 1100 and the preferred conductive carbon black is Ketjen EC-600 (available from Akzo-Nobel of Chicago, Ill.) or Cabot black Pearls 2000 (available from Cabot Corporation of Boston, Mass.) having a BET surface area of 1100–1200 $m^2/g$. The ratio of activated carbon to carbon black in the active layer is suitable 60% activated carbon to 40% carbon black. The PTFE binder is present in the active layer in an amount of about 10% by total weight of the active layer.

The hydrophobic layer is made by a dry powder process in a continuous manner. The hydrophobic layer is made by mixing the low surface area, conductive, carbon black and the PTFE bonder and dry pressing this material onto a metal grid current collector.

The active layer is made by a liquid suspension of the active layer ingredients and applying the suspension directly to the hydrophobic layer after the hydrophobic layer is formed. The resulting active layer has a thickness of about 3–5 mils (75–250 microns). The final active layer composition is deposited on the hydrophobic layer by techniques such as Mayer rod, roll coating, filter bed deposition, spray coating, and the like.

To form the active layer, the activated carbon is catalyzed with the oxygen reduction catalyst according to the method of the present invention. Next, the catalyzed carbon is chopped and mixed with the high surface area conductive carbon black. An aqueous suspension of PTFE is added to the mixture of catalyzed activated carbon and carbon black to form a paste. This paste is dried for twenty hours at 100° C. and then chopped. This material is then deposited on the hydrophobic layer to form the active layer and complete the cathode. Particular embodiments of the two types of cathodes described above are illustrated in the following Examples 1 and 2, respectively.

EXAMPLE 1

A first solution comprising 59.5% by weight cyclohexane, 25.5% by weight Igepal 520 (a surfactant), and 15% by weight manganese nitrate $Mn(NO_3)_2$ is prepared. The solution is mixed in an ultrasonic bath to form a transparent suspension. A second solution comprising 59.5% by weight cyclohexane, 25.5% by weight Igepal 520, and 15% by weight tetraethylammonium hydroxide $(C_2H_5)_4NOH$ is prepared. The second solution is also mixed in an ultrasonic bath. The second solution is added to the first solution forming a black mixture. 19 grams of activated carbon per gram of manganese (as metal) in solution is added to the mixture, and the mixture is then sonicated for 30 minutes. A precipitate is isolated from the resulting solution by centrifugation. The precipitate is then heated at 500° C. for two hours under inert atmosphere to yield a manganese oxide.

The catalyst material is then mixed with a high surface area carbon black to form a cathode material. The carbon black is a mixture of 30% by weight Ketjen EC-600JD carbon black having a surface area of 1200 $m^2/g$ and 70% by weight Shawinigan carbon black from Chevron having a surface area of 70–90 $m^2/g$. The air side of the cathode is covered with polytetrafluoroethylene film and the separator between the air cathode and the gelled anode is 3501 CELGARD™ wettable microporous polypropylene from Hoecchst Celanese Corporation of Charlotte, N.C.

The cathode is made by the dry press method which comprises pressing a dry active layer against a current collector under high temperatures. The active layer mixture is formed by mixing the carbon blacks with the catalyst material and then adding Teflon 30B to the mixture. The oxygen reduction catalyst is present in an amount of 5% by weight of the active layer, carbon black is present in an amount of 75% by weight of the active layer, and polytetrafluoroethylene (Teflon) is present in an amount of 20% by weight of the active layer. The resulting active layer mixture is dried for over 20 hours in a convection oven at 100° C. The dried active layer mixture is then chopped to a particle size of about 180 microns in a blender.

The current collector is rinsed with MeOH and then the dried active layer mixture is spread on the current collector. The active layer and current collector are wrapped in stainless steel foil and placed between the plates of a hot hydraulic press. The current collector and active layer are then pressed for 15 minutes at 617° F. and 3,300 psig.

EXAMPLE 2

A first solution comprising 59.5% by weight cyclohexane, 25.5% by weight Igepal 520 (a surfactant), and 15% by weight manganese nitrate $Mn(NO_3)_2$ is prepared. The solution is mixed in an ultrasonic bath to form a transparent suspension. A second solution comprising 59.5% by weight cyclohexane, 25.5% by weight Igepal 520, and 15% by weight tetraethylammonium hydroxide $(C_2H_5)_4NOH$ is prepared. The second solution is also mixed in an ultrasonic bath. The second solution is added to the first solution forming a black mixture. 19 grams of activated carbon per gram of manganese (as metal) in solution is added to the mixture, and the mixture is then sonicated for thirty minutes. A precipitate is isolated from the resulting solution by centrifugation. The precipitate is then heated at 500° C. for two hours in an inert atmosphere to yield catalyzed carbon.

The hydrophobic layer of the cathode is made by blending a mixture of Shawinigan acetylene carbon black and PTFE binder and dry pressing the mixture onto a metal grid current collector. The hydrophobic layer comprises 65% by weight acetylene black and 35% by weight Teflon binder.

The active layer of the cathode is made by chopping the catalyzed activated carbon in a coffee grounder for 5 minutes. 10.2 grams of the chopped catalyzed activated carbon and 6.8 grams of Ketjen carbon black are mixed for 10 minutes in a kitchen-type blender at a crumb setting. 6 grams of Teflon 30B at a pH of 10 and 25 milliliters of distilled water are added to the catalyzed activated carbon and carbon black mixture and mixed for 40 seconds to form a suspension. This suspension is dried for 20 hours at 100° C. in a convection oven. The dried material is then chopped in a kitchen-type blender at crumb setting to a particle size of about 100 microns. This active layer is then deposited on the previously formed hydrophobic layer in a liquid suspension as described above.

It is to be understood that these examples are illustrative embodiments and that this invention is not to be limited by any of the examples or details in the description. Those skilled in the art will recognize that the present invention is capable of many modifications and variations without departing from the scope of the invention. Accordingly, the detailed description and examples are meant to be illustrative and are not meant to limit in any manner the scope of the invention as set forth in the following claims. Rather, the claims appended hereto are to be construed broadly within the scope and spirit of the invention.

I claim:

1. A method of making a catalyst for use in an electrochemical cell, the method comprising:
    preparing a first solution comprising a first solvent, a first surfactant, and a manganese (II) salt;
    preparing a second solution comprising a second solvent, a second surfactant and ammonium hydroxide;
    admixing the first solution, the second solution and activated carbon wherein micelles are present and a precipitate is formed; and
    heating the precipitate at a temperature sufficient to form manganese oxide;
    wherein the first solvent can be the same or different from the second solvent, and the first surfactant can be the same or different from the second surfactant.

2. The method of claim 1, wherein the first solvent and the second solvent is selected from a group consisting of hexanes, petroleum ether, decalin and mixtures thereof.

3. The method of claim 2, wherein the first solvent and the second solvent is cyclohexane.

4. The method of claim 1, wherein the precipitate is heated to a temperature from about 450° C. to about 700° C.

5. The method of claim 1, wherein the first surfactant and the second surfactant are nonionic surfactants.

6. The method of claim 1, wherein the manganese (II) salt is manganese nitrate.

7. The method of claim 1, wherein the ammonium hydroxide is tetraethylammonium hydroxide.

8. The method of claim 1, wherein the first solution and the second solution are each sonicated prior to admixing.

9. The method of claim 1, wherein the mixture of the first solution, second solution and activated carbon is sonicated prior to heating.

10. The method of claim 1, wherein the first solution comprises from about 10% to about 25% by weight of manganese nitrate.

11. The method of claim 1, wherein the second solution comprises from about 10% to about 25% by weight ammonium hydroxide.

12. The method of claim 1, wherein the catalyst particles formed are submicron.

13. A catalyst made according to the method of claim 1.

14. An air electrode comprising a catalyst made according to the method of claim 1.

15. An air cathode for use in a metal-air electrochemical cell comprising:
    an active layer comprising a binder/non-wetting agent, and a manganese based oxygen reduction catalyst dispersed in an oxygen adsorptive material; and
    a current collector in contact with the active layer;
    wherein the manganese based oxygen reduction catalyst is made by a micelle encapsulation method comprising:
        preparing a first solution comprising a first solvent, a first surfactant, and a manganese (II) salt;
        preparing a second solution comprising a second solvent, a second surfactant and ammonium hydroxide, wherein the first solvent can be the same or different from the second solvent and the first surfactant can be the same or different from the second surfactant;
        admixing the first solution, the second solution and activated carbon wherein micelles are present and a precipitate is formed; and
        heating the precipitate at a temperature sufficient to form the manganese based oxygen reduction catalyst.

16. The air cathode of claim 15, wherein the oxygen reduction catalyst is made from manganese nitrate $Mn(NO_3)_2$.

17. The air cathode of claim 15, wherein the oxygen reduction catalyst is in the form of submicron particles.

18. The air cathode of claim 15, wherein the oxygen adsorptive material is a particulate material.

19. The air cathode of claim 18, wherein the particulate material is carbon black or activated carbon.

20. The air cathode of claim 15, wherein the active layer comprises one or more additional oxygen reduction catalysts.

21. The air cathode of claim 20, wherein the one or more additional oxygen reduction catalysts is selected from the group consisting of silver, cobalt oxides, transition metal macrocyclics, spinels, pervoskites, and mixtures thereof.

22. The air cathode of claim 15, wherein the binder/nonwetting agent is polytetrafluoroethylene.

23. The air cathode of claim 15, wherein the active layer comprises from about 3 to about 10% by weight of the oxygen reduction catalyst, from about 70 to about 85% by weight of the oxygen adsorptive material, and from about 5 to about 25% by weight of the non-wetting agent/binder.

24. The air cathode of claim 15, wherein the current collector is selected from the group consisting of nickel plated screen and nickel expanded metal.

25. An air cathode for use in a metal-air electrochemical cell comprising:
    an active layer comprising a manganese based oxygen reduction catalyst dispersed in an activated carbon;
    a hydrophobic layer; and
    a current collector;
    wherein the manganese based oxygen reduction catalyst is made by a micelle encapsulation method comprising:
        preparing a first solution comprising a first solvent, a first surfactant, and a manganese (II) salt;
        preparing a second solution comprising a second solvent, a second surfactant and ammonium hydroxide, wherein the first solvent can be the same or different from the second solvent and the first surfactant can be the same or different from the second surfactant;
        admixing the first solution, the second solution and activated carbon wherein micelles are present and a precipitate is formed; and
        heating the precipitate at a temperature sufficient to form the manganese based oxygen reduction catalyst.

26. The air cathode of claim 24, wherein the oxygen reduction catalyst is from manganese nitrate.

27. The air cathode of claim 24, wherein the oxygen reduction catalyst is in the form of submicron particles.

28. The cathode of claim 24, wherein the active layer further comprises a high surface area carbon black and a binder.

29. The cathode of claim 28, wherein the binder is polytertafluoroethylene.

30. The cathode of claim 28, wherein the ratio of activated carbon to carbon black in the active layer is from about 60% to about 40% by weight and polytetrafluoroethylene is present in an amount from about 10% to about 25% by total weight of the active layer.

31. A method of producing am air cathode for use in a metal-air cell, the method comprising:

preparing a first solution comprising a first solvent, a first surfactant, and a manganese (II) salt;

preparing a second solution comprising a second solvent, a second surfactant and ammonium hydroxide, wherein the first solvent can be the same or different from the second solvent and the first surfactant can be the same or different from the second surfactant;

admixing the first solution, the second solution and activated carbon wherein micelles are present and a precipitate is formed;

heating the precipitate at a temperature sufficient to form a manganese based oxygen reduction catalyst;

forming an active layer comprising the manganese based oxygen reduction catalyst dispersed throughout an oxygen adsorptive material; and positioning a current collector to be in contact with the active layer.

32. The method of claim 31, wherein the oxygen reduction catalyst is made from manganese nitrate.

33. The method of claim 31, wherein the oxygen reduction catalyst is in the form of submicron particles.

34. The method of claim 31, wherein the oxygen adsorptive material is a particulate material.

35. The method of claim 34, wherein the particulate material is carbon black or an activated carbon.

36. The method of claim 31, wherein the active layer comprises one or more additional oxygen reduction catalysts.

37. The method of claim 36, wherein the one or more additional oxygen reduction catalysts is selected from the group consisting of silver, cobalt oxides, transition metal macrocyclics, spinels, pervoskites, and mixtures thereof.

38. The method of claim 31, wherein the binder/nonwetting agent is polytetrafluoroethylene.

39. The method of claim 31, wherein the active layer comprises from about 3 to about 10% by weight of the oxygen reduction catalyst, from about 70 to about 85% by weight of the oxygen adsorptive material, and from about 5 to about 25% by weight of the non-wetting agent/binder.

* * * * *

UNITED STATES PATENT AND TRADEMARK OFFICE
CERTIFICATE OF CORRECTION

PATENT NO. : 6,428,931 B1
DATED : August 6, 2002
INVENTOR(S) : Golovin

It is certified that error appears in the above-identified patent and that said Letters Patent is hereby corrected as shown below:

Title page,
Item [56] References Cited, OTHER PUBLICATIONS,
"Universtiy" should read -- University --; and
"Noburu" should read -- Noboru --.

Column 8.
Line 52, "claim 24" should read -- claim 25 --;
Line 53, after "is" insert -- made --;
Lines 54 and 56, "claim 24" should read -- claim 25 --.

Signed and Sealed this

Eighteenth Day of February, 2003

JAMES E. ROGAN
*Director of the United States Patent and Trademark Office*